June 2, 1953  T. M. CURLEY  2,640,604

TIRE AND WHEEL HANDLING AND STRIPPING MACHINE

Filed March 29, 1950  3 Sheets-Sheet 1

INVENTOR.
TODD M. CURLEY
BY Leech & Radue
ATTORNEYS

June 2, 1953          T. M. CURLEY          2,640,604
TIRE AND WHEEL HANDLING AND STRIPPING MACHINE
Filed March 29, 1950          3 Sheets—Sheet 2
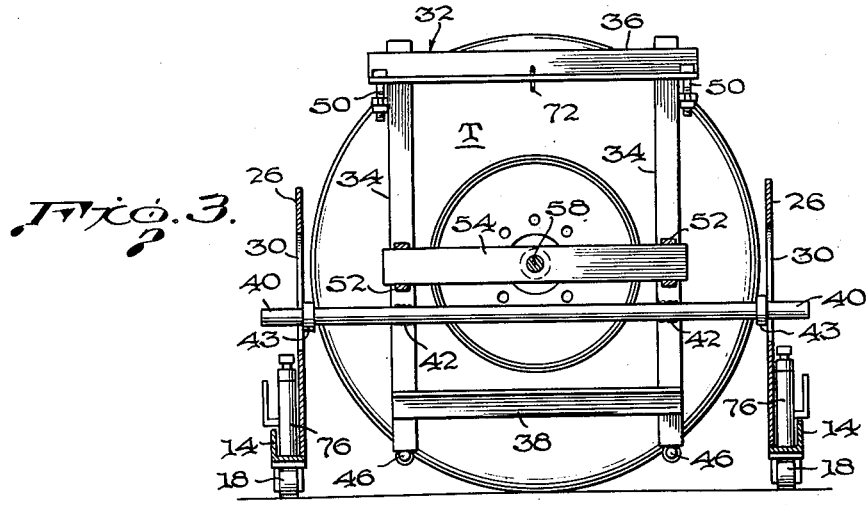
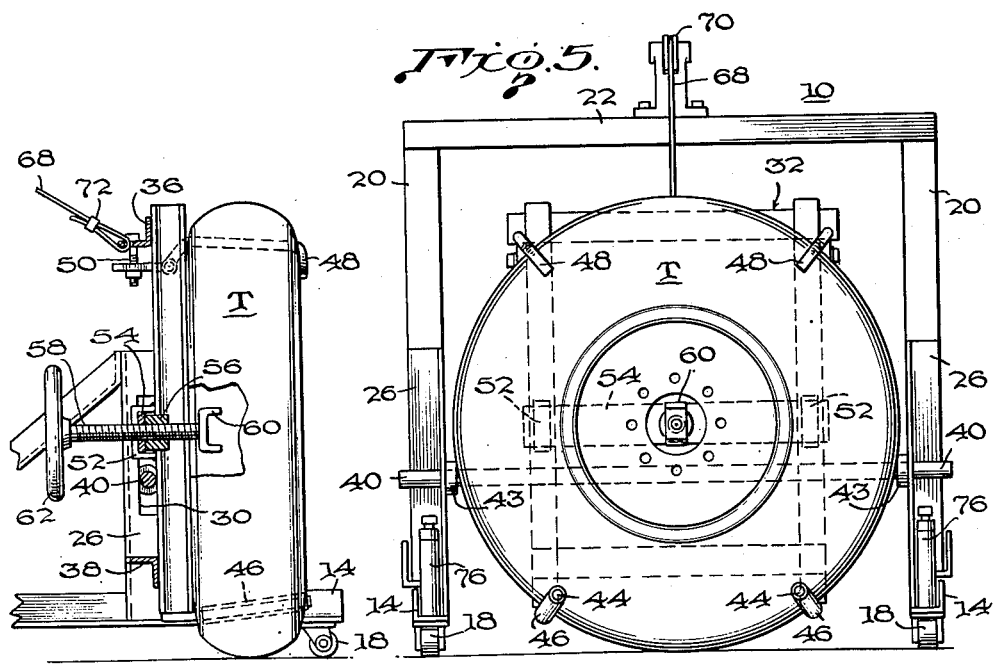
INVENTOR.
TODD M. CURLEY
BY
Leech & Radue
ATTORNEYS June 2, 1953 T. M. CURLEY 2,640,604
TIRE AND WHEEL HANDLING AND STRIPPING MACHINE
Filed March 29, 1950 3 Sheets-Sheet 3
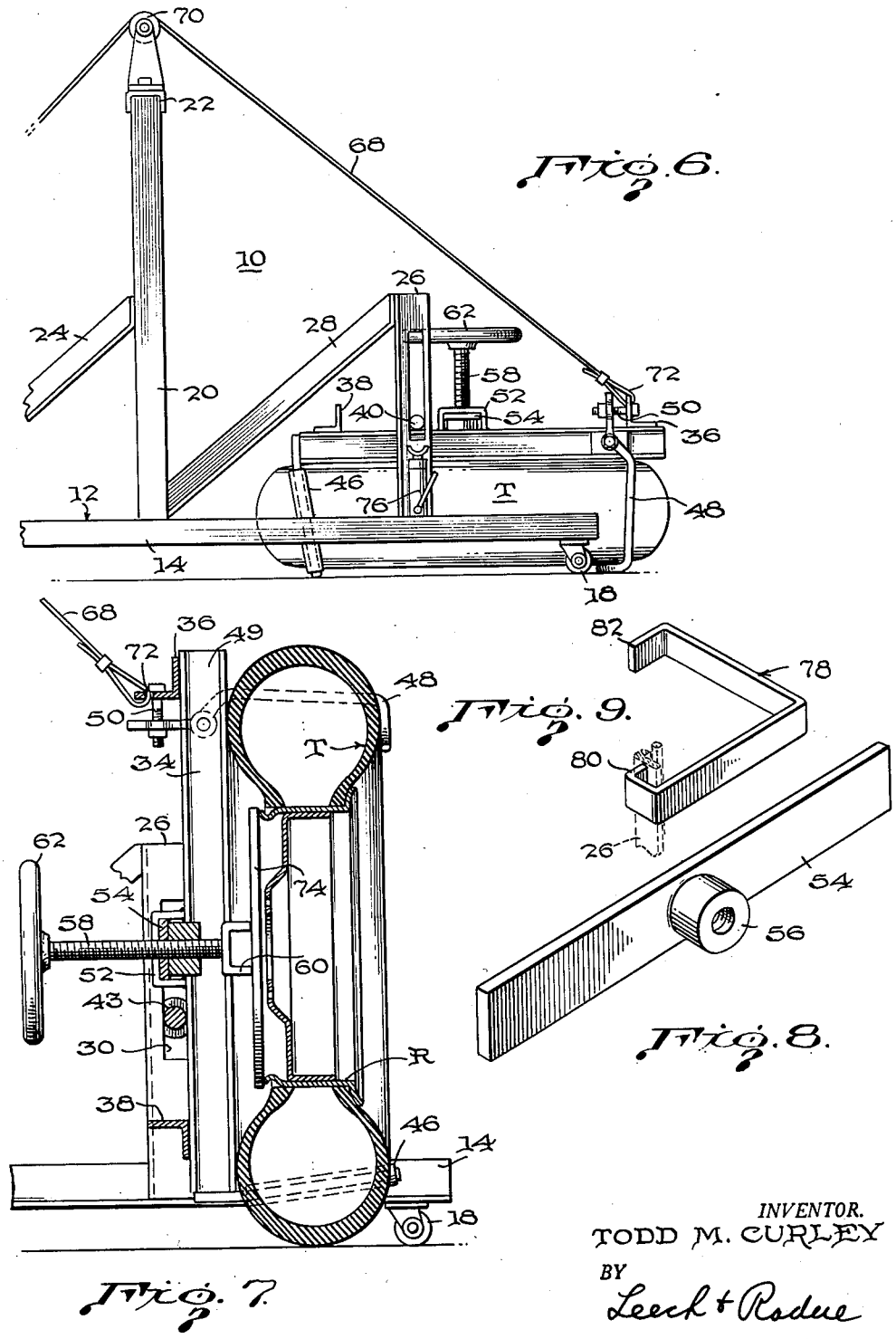
INVENTOR.
TODD M. CURLEY
BY
Leech & Radue
ATTORNEYS Patented June 2, 1953

2,640,604

UNITED STATES PATENT OFFICE 2,640,604

TIRE AND WHEEL HANDLING AND STRIPPING MACHINE

Todd M. Curley, Mahanoy City, Pa.

Application March 29, 1950, Serial No. 152,697

8 Claims. (Cl. 214—1)

This invention relates to apparatus for handling motor vehicle wheels and more particularly to a machine for removing a wheel and tire and handling the assembly in an efficient manner.

Many of the heavy industrial motor vehicles in use today have extremely heavy tire and wheel assemblies weighing considerably more than one ton. The problem of removing a heavy assembly of this nature from the axle and separating the tire and wheel rim for repair or renewal is a job that has required a great deal of manual labor or heavy and not always available load handling equipment in the form of cranes or the like. The invention to be described herein offers a simple and efficient solution to this problem.

It is a principal object of the invention to provide a tire and wheel stripping and handling apparatus of simple, rugged construction mounted for use on a wheeled carriage or dolly.

A further object of the invention resides in the provision of a machine of this character that is capable of removing a heavy wheel and tire assembly from the axle of the vehicle, transporting it to a convenient place for working upon, and stripping the tire from the wheel rim.

A further object of the invention is to provide a wheel and tire handling apparatus for removing a tire and wheel assembly from the axle in vertical position, transporting it in that position, and lowering it into a horizontal position on the ground or floor for working upon, by utilizing a portion of the tire as the pivot for lowering or raising.

More specifically, it is intended to provide a wheel and tire supporting carriage having a tire carrying frame mounted for combined rotational and up and down sliding movement with respect to said carriage. A related object is satisfied by the inclusion in such a machine of jack means for lifting a wheel and tire assembly carried by said frame to align it with the axle of a motor vehicle, or merely to maintain it free of the ground during carriage movement.

A further and specific object of the invention is to provide a machine of the character described in which the tire and wheel carrying framework has spaced means for engaging peripheral portions of the tire and detachably holding the same on the frame.

A still further and specific object is to provide the tire carrying and supporting frame with screw means constructed and arranged to react against the axle of the vehicle to remove the wheel and tire when the latter is secured to the frame.

An additional and specific object of the invention resides in the provision of a tire and wheel handling apparatus having a tire supporting and mounting frame provided with screw means and a pressure applying member engageable with the rim of the wheel to separate it from the tire when the latter is held and supported on the carrying frame.

A still further object of the invention is to provide a tire and wheel removing and carrying apparatus having a tire engaging and supporting frame pivotally mounted thereon for supporting the tire in a vertical position or moving it into a horizontal position and mechanical hoist means connected with the frame for controlling movement between the various operative positions.

These and other objects contributing to simplicity in construction and efficiency in operation of this invention will be more apparent from the following detailed description of a preferred embodiment taken in connection with the accompanying drawings, in which:

Fig. 3 is a vertical section taken on the line 3—3 of Fig. 1 looking in the direction of the arrows and showing further details of the wheel supporting frame;

Fig. 4 is a sectional view taken on the line 4—4 of Fig. 2 looking in the direction of the arrows and showing the wheel pulling means;

Fig. 5 is a front elevational view of the machine with the tire and wheel removed from the axle and in position to be lowered to the ground;

Fig. 6 is a fragmentary side elevational view showing the tire and tire carrying frame in lowered position;

Fig. 7 is a sectional view similar to Fig. 4 but illustrating the use of the rim separating member;

Fig. 8 is a detailed perspective view of one member of the wheel pulling means; and Fig. 9 is a detailed perspective view of a bracket arm mountable on the tire carrying frame for certain operations.

Figures 1, 2:
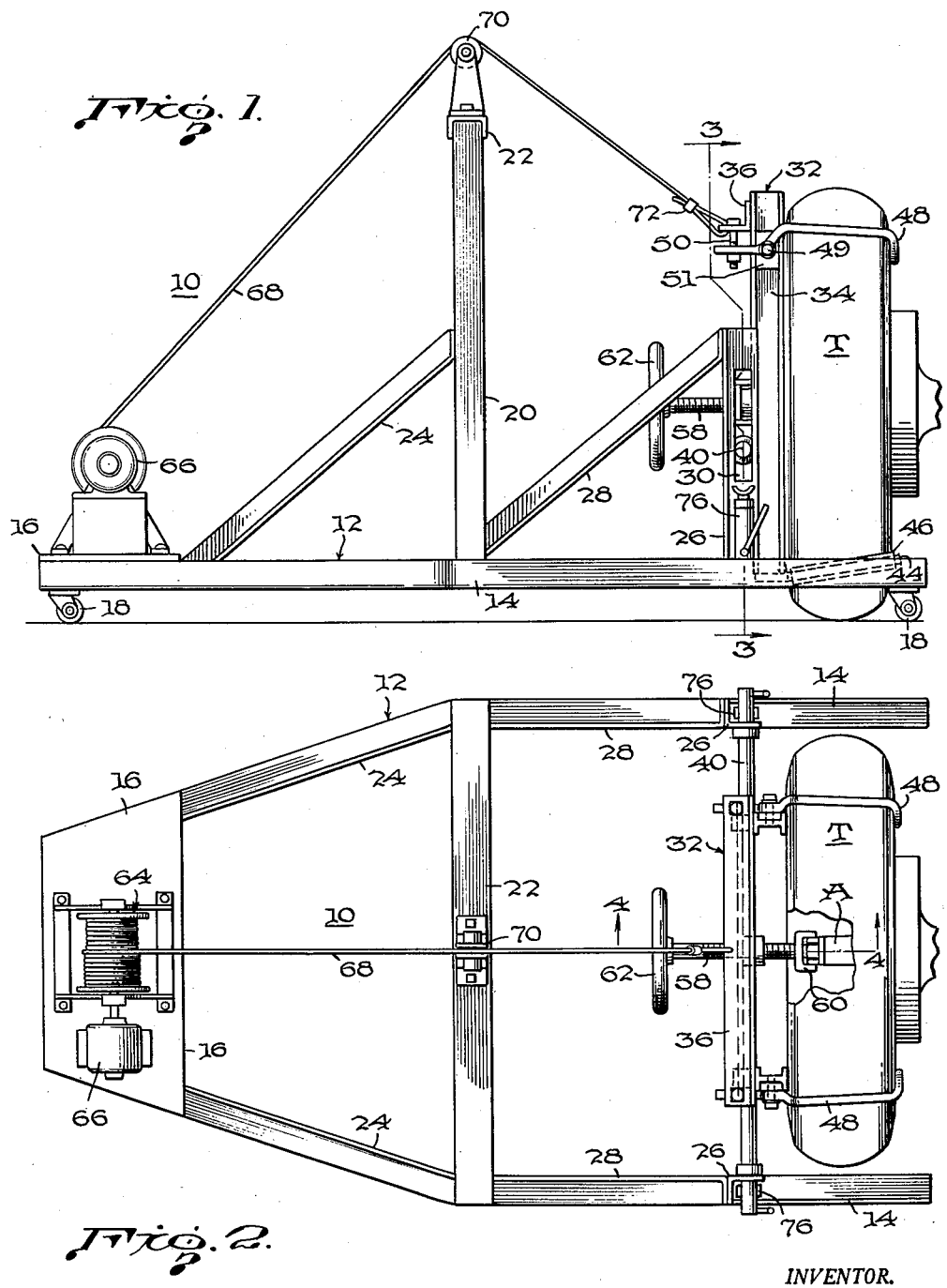
Fig. 1 is a side view in elevation showing the machine positioned beneath the wheel of a truck.
Fig. 2 is a top plan view of the machine with part of the tire broken away to illustrate the means for pulling the wheel from the axle.

With reference to Figs. 1 and 2, the tire stripping and handling machine referred to generally by the numeral 10 is shown to include a base frame 12 of approximately U-shape having a pair of forwardly projecting members 14, 14 in the form of channel bars and a rear platform 16 which may comprise a metal plate secured to the frame. The frame 12 is supported for wheeled movement by roller means in the form of free swiveling casters 18 mounted under the respective ends of the projecting members 14 and at transversely spaced points beneath the rear platform 16.

The superstructure of the machine 10 comprises a pair of upright members 20 mounted on the mid-portion of the frame 12 and connected at their tops by a cross bar 22. A pair of braces 24, 24 are connected between the intermediate portions of the respective members 20 and the base frame 12 adjacent the platform 16.

At points substantially inward or rearward of the ends of the projecting members 14 and their casters 18 a pair of upright tire and wheel supporting members 26, 26 are rigidly secured to the respective channel members 14 and maintained more securely in position by rearwardly projecting braces 28 extending between the upper ends of the members 26 and the bases of the upright members 20. The supporting members 26 are formed with vertically elongated and transversely aligned slots 30 for pivotally and slidably mounting a generally rectangular tire supporting frame 32.

As shown best in Figs. 3, 4 and 5, the tire supporting frame 32 comprises a pair of side members 34 in the form of out-turned channel sections, an upper cross bar 36 and a lower cross bar 38, both of angular section and turned toward the rear of the frame. The members of the frame 32 are rigidly and integrally secured together in any conventional manner such as welding or riveting.

The frame 32 is provided with a horizontal pivot bar 40 disposed below the center when the frame is in the vertical position shown in Fig. 3. The pivot bar 40 is fixedly secured to the back of the frame 32 by welded joints 42 on each of the side members 34. It will be noted that the stub shaft ends thus provided by the bar 40 extend outwardly through the vertical slots 30 and that the frame 32 is centered between the frame supporting members 26 by means of collars 43 engaging the respective inner faces of said supporting members.

The means for supporting and detachably securing a wheel and tire to the front side of the frame 32 will now be explained with particular reference to Figs. 1, 5 and 7. At each lower corner of the frame 32 a heavy rigid pin 44 projects outwardly and slightly upwardly and is provided with an extended roller 46 of substantially the same length. At each upper corner the frame 32 carries an elongated and forwardly extending claw or hook 48 pivoted at 49 to one of the side members 34. A threaded nut and bolt connection 50 between the upper cross bar 36 and the rearwardly extending portion of each hook 48 releasably holds the claws in secure engagement with spaced upper portions of tire T while the corresponding lower portions of the tire are supported by the inclined rollers 46. The pivot construction at 49 may be strengthened and reinforced by blocks 51 as indicated in Fig. 1.

A U-shaped metal strap 52 is suitably secured vertically, as by welding, to the inner face of each frame side member 34 in a position to receive and support a heavy cross plate 54 (Fig. 8) centrally of the frame 32 and coincidentally with the transverse axis of a vertically supported tire and wheel assembly T, as best shown in Figs. 3 and 5. The center part of the plate 54 is formed with a threaded boss 56 receiving a threaded shaft 58 extending through the plate 54 and having a pivotally mounted head member 60 on the tire side of the frame for purposes to be explained. The threaded shaft 58 is provided on the inward end with a turning member in the form of a handwheel 62.

In order to control the vertical and pivotal movement of the tire supporting frame 32 between the vertical position shown in Fig. 1 and the horizontal position illustrated in Fig. 2, a hoist 64 is mounted on the base plate 16 at the rear end of the carriage. While this hoist may be operated manually it is preferable to provide an electric motor 66 so that the hoist line 68 may be taken up or payed out quickly and with a minimum of effort. It will be noted that the line 68 extends from the hoist 64 over a guide pulley 70 mounted on the cross bar 22 at the top of the superstructure and thence to an end connection, designated generally as 72, with the center of the upper cross bar 36 of the tire frame 32.

The manner in which the cup-shaped swivel head 60 of the threaded shaft 58 is formed and arranged for cooperation with the end of a vehicle axle A is shown in Fig. 2.

In order to utilize the same threaded shaft 58 for removing a rim, a spider or plate disk 74 large enough to engage the rim without interference from the tire may be employed in the manner clearly shown in Fig. 7.

The ends of the pivot shaft 40 carried by the tire frame 32 can be raised or lowered as may be required by means of conventional jacks 76 one of which is secured to each frame member 14 in a position directly beneath the corresponding projecting shaft end, as shown in Figs. 1 and 3.

When the tire T on the wheel to be removed from the axle A is flat or deflated it is likely to slip from the grip of rollers 46 and hooks 48. In this event the machine 10 would push itself away from the hub instead of pulling the wheel. To prevent this a pair of strong, metal bracket arms 78 are hooked around the backs of the respective upright members 26 and over the tire T. Each arm 78 has a hook formation 80 operatively engageable with one of the upright members 20 (as indicated in Fig. 9) and an inturned finger portion 82 that bears on the flange of rim R.

While many of the details of operation of the apparatus of this invention have been indicated in connection with the detailed description of its construction, the complete functioning and the advantages and utility thereof will be more completely understood from the following summary of operation. Assuming that a tire and wheel assembly is to be removed from a wheel, the adjacent axle portion will be jacked up until the tire is clear of the ground and the machine 10 will be advanced to the operative relation shown in Figs. 1 and 2. The rollers 46 can be readily slipped under the lower portions of the tire and the hooks 48 will be pivoted over and onto the top portions and firmly secured in holding relation by the bolt and nut means 50. With the tire and wheel assembly T thus supported some of the pressure may be taken from the axle and the tire supported on the carriage above the ground by operating the jacks 76 to elevate the pivot bar 40 of the frame 32. If the wheel is fast and has to be pulled, the jack 76 will be elevated only enough to remove downward pressure on the axle. The screw threaded shaft 58 will then be brought into use as shown in Fig. 2, in which the loosely swiveled head member 60 engages the end of the axle. In this manner, advancing of the threaded shaft 58 will act to push the wheeled carriage and the tire and wheel assembly fixed thereon away from the axle, thus pulling the wheel.

After the carriage has been moved to a place under cover or to a position convenient for working on the wheel and tire, the jacks 76 will be lowered so that the lower portion of the tire rests on the ground or floor. While the hoist line 68 is being slowly payed out the machine or carriage is rolled or walked slowly forward causing the wheel to pivot about the point where the tire engages the ground as the frame 32 rotates about the sliding pivot bar 40. The arrangement of the pivot bar 40 below the center of the frame supported wheel uses the weight of the pivoting tire to advance the carriage and control the falling of the wheel to the ground. In this way the extremely heavy tire and wheel assembly may be readily landed in the horizontal position shown in Fig. 6. The hook members 48 are then swung aside to free the machine completely from the tire so that it can be moved out of the way.

Where necessary the rim may be stripped from the tire by the operation indicated in Fig. 7 in which the threaded shaft 58 is urged against the rim engaging disk 74 to force the rim outwardly while the tire is retained in its vertical position on the tire carrying frame 32.

A wheel and tire assembly on the ground is picked up by a reverse sequence of the lowering operations that have been described, the carriage being caused to withdraw or move backward as the lower extremity of the horizontal tire is used as the pivot point. When the hoist has pulled the wheel and tire assembly T and frame 32 into the vertical position of Fig. 1, the hoist 64 will be stopped and the jacks 76 will be used to elevate and free the assembly from the ground so that the carriage can be moved and the wheel can be remounted on the axle in a manner that will now be completely understood.

While a particular and preferred embodiment of the apparatus of this invention has been described in detail, it will be understood by those skilled in the art that various changes can be made in the construction and arrangement of parts without departing from the spirit of this invention and the scope of the appended claims.

Having thus described my invention, what I claim as novel and desire to secure by Letters Patent of the United States is:

1. A motor vehicle wheel handling machine comprising a wheeled carriage having a spaced pair of forwardly projecting members adapted to receive a tire crosswise, an upright member mounted on each projecting member inwardly of the end thereof, a wheel and tire carrying frame pivotally and slidably mounted on said upright members for movement between a horizontal plane and a vertical plane while a lower portion of the tire engages the ground beneath the carriage, said carrying frame having transversely projecting portions extending from opposite sides thereof and having a rotational axis that is below the center of the frame when the frame is in a vertical position, means for holding the tire on said tire carrying frame, hoist means connected to the upper part of said carrying frame and the carriage for controlling rotation of said frame, and jack means mounted on each side of said carriage and engageable with said transversely projecting portions of said frame for raising and lowering the same.

2. A motor vehicle wheel handling machine comprising a wheeled carriage having a spaced pair of forwardly projecting members adapted to receive a tire crosswise, an upright member mounted on each projecting member inwardly of the end thereof, a wheel and tire carrying frame pivotally and slidably mounted on said upright members for movement between a horizontal plane and a vertical plane while a lower portion of the tire engages the ground beneath the carriage, said carrying frame having transversely projecting portions extending from opposite sides thereof, a spaced pair of upwardly inclined pins projecting from the front of the bottom portion of said frame for supporting the tire, a spaced pair of hooks pivotally mounted at the top portion of said frame for holding the tire against said frame, hoist means connected to the upper part of said carrying frame and the carriage for controlling rotation of said frame, and jack means mounted on each side of said carriage and engageable said transversely projecting portions of said frame for raising and lowering the same.

3. In a machine for handling heavy motor vehicle tire and wheel assemblies, the combination comprising a dolly having a laterally spaced pair of forwardly projecting members with roller means supporting the ends of said members, an upright member mounted on each of said projecting members rearwardly of said roller means, said upright members each having a vertical slot with said slots being aligned transversely of the projecting members, a tire and wheel carrying framework disposed between said upright members, a plurality of means extending forwardly from the front of said framework in spaced relation for receiving a tire on the wheel and holding the wheel on said framework, and a pair of stub shaft ends extending laterally from opposite sides of said framework into respective engagement with said slots, the common axis of said shafts being below the center of the framework when the framework is in a vertical position.

4. In a machine for handling heavy motor vehicle tire and wheel assemblies, the combination comprising a dolly having a laterally spaced pair of forwardly projecting members with roller means supporting the ends of said members, an upright member mounted on each of said projecting members rearwardly of said roller means, said upright members each having a vertical slot with said slots being aligned transversely of the projecting members, a tire and wheel carrying framework disposed between said upright members, a spaced pair of upwardly inclined pins projecting from the front of the bottom portion of the framework for supporting a tire on a wheel, a spaced pair of hooks pivotally mounted at the top portion of said framework for engaging over top portions of the tire and holding the tire and wheel assembly on said framework, and a pair of stub shaft ends extending laterally from opposite sides of said framework into respective engagement with said slots, the common axis of said shafts being below the center of the framework when the framework is in a vertical position.

5. In a motor truck wheel handling machine, the combination comprising a wheeled carriage having a laterally spaced pair of forwardly projecting members with swiveling casters supporting the ends of said members, an upright member mounted on each of said projecting members rearwardly of said casters, said upright members each having a vertical slot with said slots being aligned transversely of the projecting members, a tire and wheel carrying framework disposed between said upright members, a plurality of means extending forwardly from the front of said framework in spaced relation for receiving a tire on the wheel and holding the wheel on said framework, a pivot shaft fixed on the rear of said framework and extending laterally from opposite sides into respective engagement with said slots, the common axis of said shaft being below the center of the framework when the framework is in a vertical position, and jack means mounted on said carriage and engageable with said pivot shaft for raising and lowering said framework.

6. In a motor truck wheel handling machine, the combination comprising a wheeled carriage having a laterally spaced pair of forwardly projecting members with swiveling casters supporting the ends of said members, an upright member mounted on each of said projecting members rearwardly of said casters, said upright members each having a vertical slot with said slots being aligned transversely of the projecting members, a tire and wheel carrying framework disposed between said upright members, a spaced pair of upwardly inclined pins projecting from the front of the bottom portion of the framework for supporting a tire on a wheel, a spaced pair of hooks pivotally mounted at the top portion of said framework for engaging over top portions of the tire and holding the tire and wheel assembly on said framework, a pivot shaft fixed on the rear of said framework and extending laterally from opposite sides into respective engagement with said slots, the common axis of said shaft being below the center of the framework when the framework is in a vertical position, and jack means mounted on said carriage and engageable with said pivot shafts for raising and lowering said framework.

7. In a motor truck wheel handling machine, the combination comprising a wheeled carriage having a laterally spaced pair of forwardly projecting members with swiveling casters supporting the ends of said members, an upright member mounted on each of said projecting members rearwardly of said casters, said upright members each having a vertical slot with said slots being aligned transversely of the projecting members, a tire and wheel carrying framework disposed between said upright members, a spaced pair of upwardly inclined pins projecting from the front of the bottom portion of the framework for supporting a tire on a wheel, a spaced pair of hooks pivotally mounted at the top portion of said framework for engaging over top portions of the tire and holding the tire and wheel assembly on said framework, a pivot shaft fixed on the rear of said framework and extending laterally from opposite sides into respective engagement with said slots, the common axis of said shaft being below the center of the framework when the framework is in a vertical position, jack means mounted on said carriage and engageable with said pivot shafts for raising and lowering said framework, and hoist means connected between the upper part of said framework and said carriage for controlling rotation of said framework.

8. In a motor truck wheel handling machine, the combination comprising a dolly having a laterally spaced pair of forwardly projecting members with roller means supporting the ends of said members, an upright member mounted on each of said projecting members rearwardly of said roller means, said upright members each having a vertical slot with said slots being aligned transversely of the projecting members, a tire and wheel carrying framework disposed between said upright members, a plurality of means extending forwardly from the front of said framework in spaced relation for receiving a tire on a wheel and holding the wheel on said framework, a pivot shaft fixedly secured on the rear of said framework and having its ends extending laterally from opposite sides thereof into respective engagement with said slots, the axis of said shaft being below the center of the framework when the framework is in a vertical position, and hoist means connected between a portion of the framework above the center thereof and to a rearward portion of the dolly for controlling rotation of said framework.

TODD M. CURLEY.

References Cited in the file of this patent

UNITED STATES PATENTS

| Number | Name | Date |
|---|---|---|
| 1,226,335 | Jones | May 15, 1917 |
| 1,305,322 | Towler | June 3, 1919 |
| 1,798,456 | Carroll | Mar. 31, 1931 |
| 2,379,587 | Moore | July 3, 1945 |
| 2,444,992 | Kittel | July 13, 1948 |
| 2,448,414 | Branick | Aug. 31, 1948 |
| 2,500,285 | Horton et al. | Mar. 14, 1950 |
| 2,536,614 | Syracusa | Jan. 2, 1951 |